United States Patent
Honda et al.

(10) Patent No.: US 6,462,782 B1
(45) Date of Patent: Oct. 8, 2002

(54) DATA EXTRACTION CIRCUIT USED FOR REPRODUCTION OF CHARACTER DATA

(75) Inventors: Yoshitaka Honda, Kawasaki; Shigeru Inada, Yokohama, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/468,087

(22) Filed: Dec. 21, 1999

(30) Foreign Application Priority Data

Dec. 24, 1998 (JP) .......................................... 10-367213

(51) Int. Cl.[7] .............................................. H04N 11/00
(52) U.S. Cl. ...................... 348/465; 348/461; 348/468; 725/137
(58) Field of Search .................................. 348/465, 476, 348/525, 540, 468, 461, 467; 725/137, 136, 139, 135

(56) References Cited

U.S. PATENT DOCUMENTS

| 4,794,626 | A | * | 12/1988 | Tanabe et al. ............... 375/368 |
|---|---|---|---|---|
| 5,347,365 | A | | 9/1994 | Harigai et al. |
| 5,371,545 | A | * | 12/1994 | Tults ........................... 348/465 |
| 5,404,172 | A | * | 4/1995 | Berman et al. ............. 348/465 |
| 5,453,794 | A | * | 9/1995 | Ezaki .......................... 348/461 |
| 5,483,289 | A | * | 1/1996 | Urade et al. ................ 348/468 |
| 5,506,626 | A | * | 4/1996 | Yagi et al. ................... 348/464 |
| 5,555,025 | A | * | 9/1996 | McArthur .................... 348/478 |
| 5,559,560 | A | * | 9/1996 | Lee ............................. 348/465 |
| 5,592,300 | A | * | 1/1997 | Huh ............................ 386/113 |
| 5,598,219 | A | * | 1/1997 | Furuya et al. .............. 348/465 |
| 5,657,088 | A | * | 8/1997 | Hankinson .................. 348/465 |
| 5,701,161 | A | * | 12/1997 | Williams et al. ............ 348/468 |
| 5,852,471 | A | * | 12/1998 | Furuya et al. .............. 348/465 |
| 5,861,925 | A | * | 1/1999 | Fujitaka ...................... 348/465 |
| 6,281,934 | B1 | * | 8/2001 | Nakatani .................... 348/465 |
| 6,285,403 | B1 | * | 9/2001 | Lee ............................. 348/465 |

FOREIGN PATENT DOCUMENTS

JP          62-281688          12/1987

* cited by examiner

*Primary Examiner*—John Miller
*Assistant Examiner*—Paulos M Natnael
(74) *Attorney, Agent, or Firm*—Oblon, Spivak, McClelland, Maier & Neustadt, P.C.

(57) ABSTRACT

In a data extraction circuit used for reproducing character data such as a closed caption and a text, a horizontal sync digital PLL circuit generates an fh sync system clock signal, which is synchronized with a horizontal sync signal fh, in response to a digital video signal from an ADC. Based on the fh sync system clock signal, a clock generation circuit generates a data extracting clock signal which is synchronized with the horizontal sync signal fh. The data extracting clock signal can thus be caused to follow horizontal jitters. Consequently, character data can be reproduced with stability, irrespective of variations in frequency.

17 Claims, 4 Drawing Sheets

DATA EXTRACTION CIRCUIT USED FOR REPRODUCTION OF CHARACTER DATA

BACKGROUND OF THE INVENTION

The present invention relates to a data extraction circuit used for reproduction of character data such as a closed caption and a text. More specifically, the present invention relates to a data extraction circuit used in a video signal reproduction circuit such as a television receiver and a video playback machine.

In a prior art data extraction circuit used for reproduction of character data, a CRI (clock run-in) signal is detected from a video signal on which character data such as a closed caption and a text is superimposed. Then, a clock signal for data reproduction is generated from the CRI signal, and the character data is reproduced in response to the clock signal.

Figure 1:
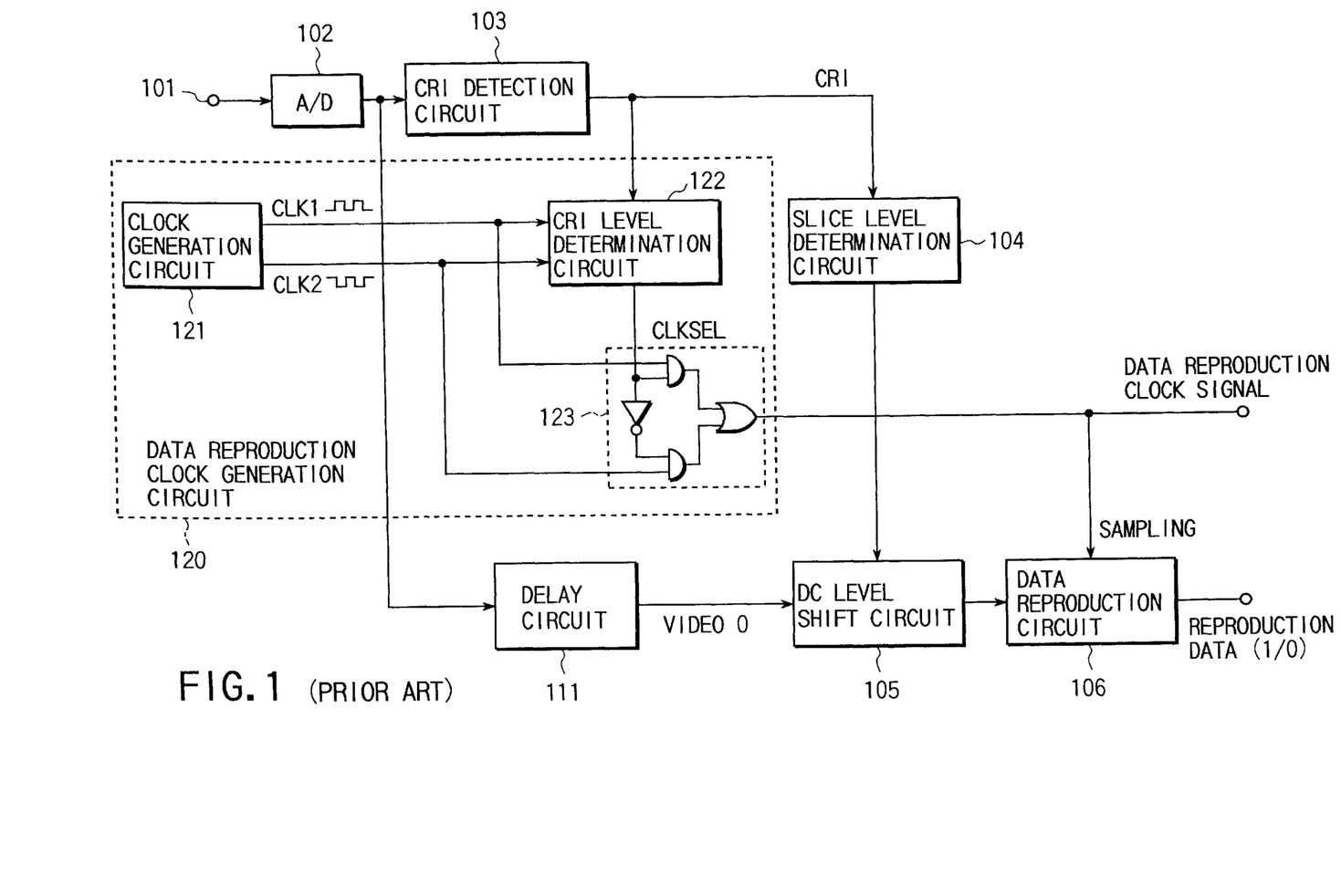
FIG. 1 is a block diagram showing a prior art data extraction circuit to explain its problems.

FIG. 1 shows an overview of arrangement of a prior art data extraction circuit as described above. In this figure, an analog video signal, which is output from a video signal output terminal of a television receiver, is input to a video signal input terminal 101. A video signal on which a data line including character data such as a closed caption and a text is superimposed, or a normal video signal (on which no data line is superimposed) is input as the analog video signal. These analog video signals are supplied to an A/D converter (A/D) 102.

The A/D 102 converts the analog video signal, which is input to the video signal input terminal 101, into a digital video signal and then outputs it to both a CRI detection circuit 103 and a delay circuit 111.

The CRI detection circuit 103 detects whether the digital video signal (data line) output from the A/D 102 includes a CRI signal having eight cycles. If the CRI signal is included, it is supplied as a detection signal CRI to a slice level determination circuit 104 and a CRI level determination circuit 122 in a data reproduction clock generation circuit 120.

The slice level determination circuit 104 integrates the detection signal CRI output from the CRI detection circuit 103. The circuit 104 then supplies a DC level shift circuit 105 with a slice level determination signal having a level corresponding to an average of the integrated values.

The DC level shift circuit 105 shifts a level of the middle of an amplitude of a time-adjusted digital video signal (video 0), which is output from the delay circuit 111, based on the slice level determination signal output from the slice level determination circuit 104. The circuit 105 sends out the level-shifted digital video signal to a data reproduction circuit 106.

The delay circuit 111 delays the digital video signal output from the A/D 102 in accordance with time required until a clock signal is generated by the data reproduction clock generation circuit 120.

The data reproduction clock generation circuit 120 detects the detection signal CRI output from the CRI detection circuit 103 to generate a clock signal for reproduction of character data. The circuit 120 includes a clock generation circuit 121, the CRI level determination circuit 122, and a clock selection circuit 123.

The clock generation circuit 121 has two times as high as that of the detection signal CRI and generates two-phase clock signals CLK1 and CLK2 which are not synchronized with the detection signal CRI.

The CRI level determination circuit 122 compares the levels of detection signals CRI output from the CRI detection circuit 103 in respective timings of the two-phase clock signals CLK1 and CLK2 generated from the clock generation circuit 121. In response to the comparison result, the circuit 122 outputs determination signals CLKSEL of different logic levels to the clock selection circuit 123.

The clock selection circuit 123 is constituted of a combination of logic circuits such as an AND circuit and an OR gate. The circuit 123 obtains a difference between a logic level of the determination signal CLKSEL output from the CRI level determination circuit 122 and that of each of the two-phase clock signals CLK1 and CLK2 generated from the clock generation circuit 121. The circuit 123 then supplies a signal having a greater difference to the data reproduction circuit 106 as a data reproduction clock signal.

The data reproduction circuit 106 samples the digital video signal, which is level-shifted by the DC level shift circuit 105, in response to the data reproduction clock signal generated from the data reproduction clock generation circuit 120 and supplied from the clock selection circuit 123. Thus, the circuit 106 reproduces character data such as a closed caption and a text, which is superimposed on the digital video signal, and outputs it as reproduction data (1/0).

As described above, the prior art data extraction circuit is so constituted as to detect a CRI signal of eight cycles included in a data line and generate a clock signal for reproduction of character data.

If, however, the frequency (synchronization of horizontal/vertical sync signals) of an analog video signal varies, the data rate (cycle of CRI signal) of the data line does. Even though a clock signal for data reproduction can be generated, it is not synchronized with the CRI signal after the frequency varies). For this reason, in the prior art data extraction circuit for generating a clock signal for data reproduction by detecting a CRI signal contained in the data line, it is likely that the circuit cannot follow the frequency variations of an analog video signal or stably reproduce character data such as a closed caption and a text.

BRIEF SUMMARY OF THE INVENTION

The object of the present invention is to provide a data extraction circuit capable of stably generating a clock signal for data extraction and stably reproducing character data, irrespective of variations in frequencies of video signals.

To attain the above object, there is provided a data extraction circuit comprising a slice level determination circuit configured to determine a slice level of a data line of character data superimposed on a digital video signal, a line extraction circuit configured to slice the digital video signal by the slice level and extract the data line of the character data from the digital video signal, a sync signal detection circuit configured to detect a sync signal for analyzing the character data, the sync signal being contained in the data line of the character data, a bit detection circuit configured to detect a start bit indicative of a start of the character data, the start bit being contained in the data line of the character data, a clock generation circuit configured to generate a data extracting clock, which is synchronized with a reference signal, based on detection results of the sync signal and the start bit, and a data reproduction section configured to reproduce the character data from the data line of the character data using the data extracting clock.

There is also provided a data extraction circuit comprising a first clock generation circuit for generating a system clock, which is synchronized with a reference signal, from a digital video signal on which standardized character data is superimposed as a data line, a slice level determination circuit for determining a slice level of the data line of the character data, a line extraction circuit for slicing the digital video signal by the slice level determined by the slice level determination circuit and extracting the data line of the character data from the digital video signal, a sync signal detection circuit for detecting whether a sync signal for analyzing the character data is present, from the data line of the character data extracted by the line extraction circuit, a bit detection circuit for detecting a start bit, which indicates a start of the character data, from the data line of the character data extracted by the line extraction circuit, a second clock generation circuit for generating a data extracting clock, which is synchronized with a reference signal, in response to the system clock generated by the first clock generation circuit based on detection results of the sync signal detection circuit and the bit detection circuit, and a data reproduction section for reproducing the character data from the data line of the character data extracted by the line extraction circuit, using the data extracting clock generated by the second clock generation circuit.

According to the data extraction circuit of the present invention, a data extracting clock signal can be generated based on a reference signal such as a horizontal sync signal and an fsc (subcarrier frequency) sync system clock signal. It is thus possible to resolve a drawback in which character data such as a closed caption and a text cannot be reproduced when an analog video signal varies in frequency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 2:
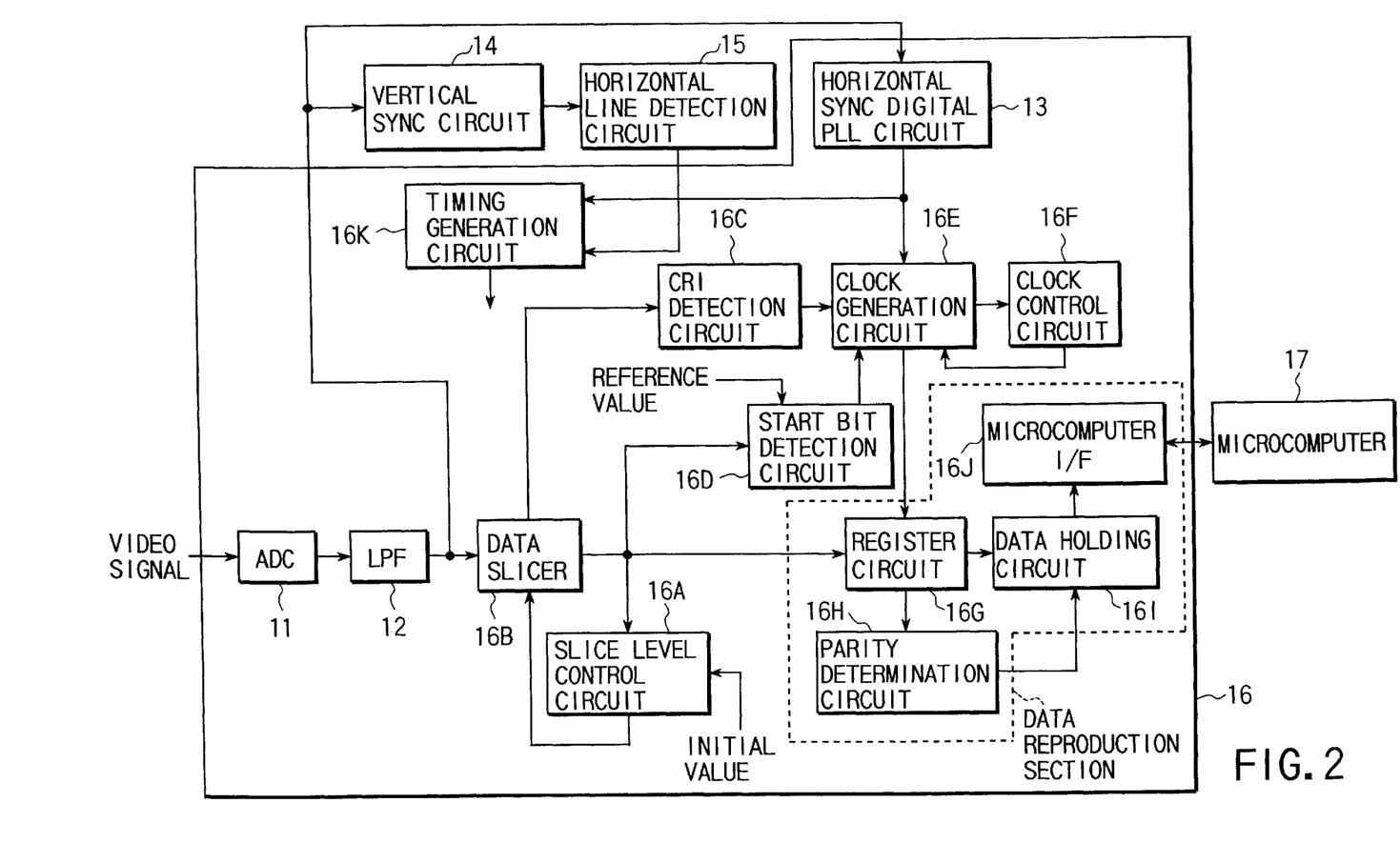
FIG. 2 is a schematic block diagram of a CCD (closed caption data) reproduction circuit according to an embodiment of the present invention.

FIG. 2 is a schematic block diagram of a data extraction circuit according to the embodiment of the present invention. In FIG. 2, a CCD reproduction circuit is shown as the data extraction circuit.

The CCD reproduction circuit includes a vertical sync circuit 14, a horizontal line detection circuit 15, a data extraction circuit 16, and an external microcomputer 17.

The data extraction circuit 16 includes an ADC (analog-to-digital converter) 11, a digital filter 12 serving as a filter circuit, a horizontal sync digital PLL (phase locked loop) circuit 13 serving as a first clock generation circuit, a slice level control circuit (slice level determination circuit) 16A, a data slicer (line extraction circuit) 16B, a CRI detection circuit (sync signal detection circuit) 16C, a start bit detection circuit (bit detection circuit) 16D, a clock generation circuit (second clock generation circuit) 16E constituted of a digital oscillation circuit, a clock control circuit 16F, a register circuit 16G, a parity determination circuit 16H, a data holding circuit 16I, an interface circuit (microcomputer I/F) 16J, and a timing signal generation circuit 16K.

In the circuit shown in FIG. 2, an analog video signal, which is output from a video signal output terminal of a television receiver, is input to the ADC 11 of the data extraction circuit 16.

The ADC 11 converts the analog video signal into a digital video signal and supplies it to the digital filter 12. A video signal on which a data line of CCD is superimposed, or a normal video signal is input as the analog video signal.

The digital filter 12 is constituted of, e.g., a low-pass filter (referred to as an LPF hereinafter). The LPF 12 eliminates a noise component and a video signal of an undesired band from the digital video signal output from the ADC 11, and supplies the digital video signal to the horizontal sync digital PLL circuit 13, vertical sync circuit 14 and data slicer 16B.

The horizontal sync digital PLL circuit 13 generates an fh sync system clock signal, which is synchronized with a reference signal (a horizontal sync signal fh), from the digital video signal output from the LPF 12. The circuit 13 then supplies the fh sync system clock signal to both the clock generation circuit 16E and timing signal generation circuit 16K.

The vertical sync circuit 14 separates a vertical sync signal from the digital video signal output from the LPF 12 and determines synchronization of the vertical sync signal. The circuit 14 sends out the vertical sync signal to the horizontal line detection circuit 15.

The horizontal line detection circuit 15 detects a scanning line (a horizontal line) of the digital video signal on which a data line of CCD is superimposed, in response to the vertical sync signal output from the vertical sync circuit 14. The circuit 15 then outputs a detection result to the timing signal generation circuit 16K.

The slice level control circuit 16A sequentially captures a sync signal (a CRI signal) for analyzing character data of CCD from the data line of CCD supplied from the data slicer 16B. In response to the CRI signal, the circuit 16A determines a slice level necessary for extracting the data line of CCD from the digital video signal with stability. This will be detailed later.

The data slicer 16B slices (level-shifts) the digital video signal supplied from the LPF 12 in accordance with the slice level determined by the slice level control circuit 16A. The slicer 16B then extracts a data line of CCD from the digital video signal and supplies it to the slice level control circuit 16A, CRI detection circuit 16C, start bit detection circuit 16D and register circuit 16G. The data slicer 16B includes a level shift circuit and an integrator circuit (neither of which is shown). The level shift circuit adds a digital video signal to slice level data, and clips the digital video signal, which is shifted in accordance with the slice level data, to a given data value when the digital video signal is set to not smaller than a certain data value. The integrator circuit eliminates a noise component from the level-shifted digital video signal.

The CRI detection circuit 16C detects a CRI signal for analyzing character data which is contained in the data line of CCD extracted by the data slicer 16B. When the circuit 16C detects a CRI signal having a given number of cycles (usually eight cycles), it supplies a CRI detection signal to the clock generation circuit 16E.

The start bit detection circuit 16D detects a start bit (described later) contained in the data line of CCD extracted by the data slicer 16B. When the start bit is detected, the circuit 16D sends a start bit detection signal to the clock generation circuit 16E.

The clock generation circuit 16E generates a data extracting clock signal, which is synchronized with a reference signal (horizontal sync signal fh), in response to the fh sync system clock signal output from the horizontal sync digital PLL circuit 13, based on the CRI detection signal output from the CRI detection circuit 16C and the start bit detection signal output from the start bit detection circuit 16D. The circuit 16E then outputs the data extracting clock signal to both the clock control circuit 16F and register circuit 16G.

The clock control circuit 16F counts the data extracting clock signal output from the clock generation circuit 16E to control an oscillation time period of the clock generation circuit 16E.

The register circuit 16G extracts character data of CCD, using the data extracting clock signal generated by the clock generation circuit 16E, from the data line of CCD extracted from the digital video signal output from the data slicer 16B, and stores it therein.

The parity determination circuit 16H checks the parity of the character data of CCD stored in the register circuit 16G, and outputs a result of the parity check to the data holding circuit 16I.

The data holding circuit 16I captures and holds the character data of CCD stored in the register circuit 16G in accordance with the result of the parity check output from the parity determination circuit 16H.

The microcomputer I/F 16J reads the character data from the data holding circuit 16I and writes it to the microcomputer 17 or receives instruction data from the microcomputer 17.

In the foregoing embodiment of the present invention, the register circuit 16G, parity determination circuit 16H, data holding circuit 16I and microcomputer I/F 16J constitute a data reproduction section.

The timing signal generation circuit 16K generates a timing signal for controlling the respective circuits, in accordance with the detection result of the horizontal line output from the horizontal line detection circuit 15 and the fh sync system clock signal output from the horizontal sync digital PLL circuit 13.

The microcomputer 17 controls the respective circuits of the data extraction circuit 16. For example, it reads the character data extracted from the data line of CCD through the microcomputer I/F 16J. Moreover, the microcomputer 17 supplies the initial value (the maximum of amplitude of sync signal<0), which serves as a reference value for obtaining a slice level, to the slice level control circuit 16A, or outputs a reference value (period of H/L, i.e., 1D/2D shown in FIG. 3) for detecting a start bit to the start bit-detection circuit 16D.

Figure 3:
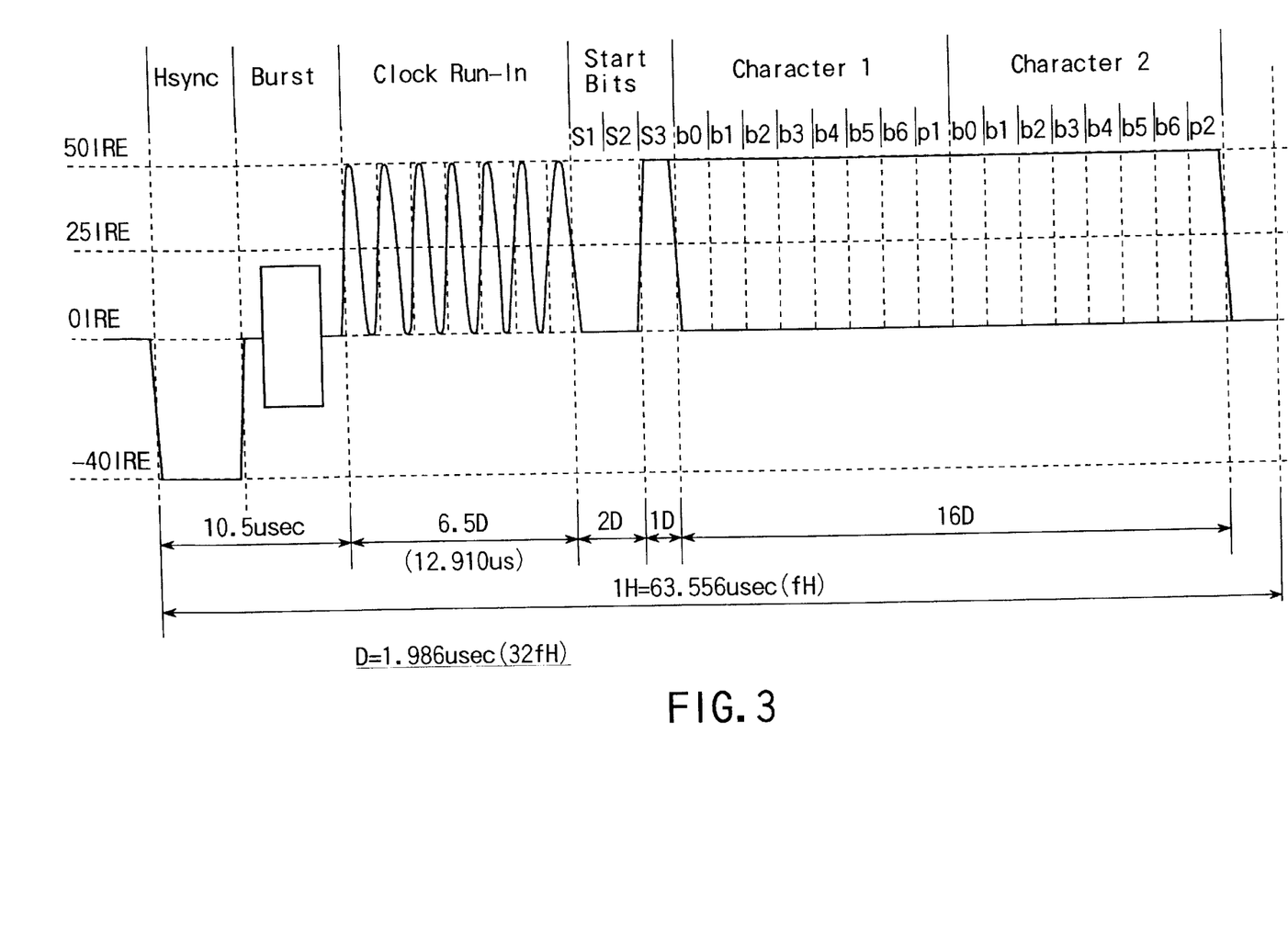
FIG. 3 is a signal waveform chart for explaining an overview of a data form of the CCD reproduction circuit.

Referring now to FIG. 3, a data form of the above CCD will be described in brief.

The CCD is data in binary NRZ (non-return to zero) format (608 standard of the Electronic Industries Association), which is, for example, superimposed in data-line form on a predetermined horizontal scanning line (generally the 21st line) in the vertical retrace time of an analog video signal of a television signal.

A burst having an fsc signal used for reproduction of color signals is added to a data line for 1H (one cycle of one horizontal synchronization), followed by the above CRI signal serving as a sync signal. Then, 3-bit start bits and 16-bit character data (characters 1 and 2) are sequentially superimposed on the data line.

In the CCD data form shown in FIG. 3, when a dynamic range of the ADC 11 is −48IRE to 144IRE, a signal level of the data line of CCD which is AD-converted by the ADC 11, falls within a range from 50IRE to 0IRE.

In actuality, however, the signal level of the CCD data line is degraded by dubbing or the like, and the amplitude of the CRI signal is decreased with respect to 25IRE; accordingly, a noise component is increased. Moreover, as will be described later, when a pedestal level is always kept at 0IRE, the amplitude of a digital video signal is decreased equivalently with reference to the pedestal level. It is thus necessary to correctly obtain an intermediate value of amplitude of the CRI signal in order to stably slice the CCD data line.

Figure 4:
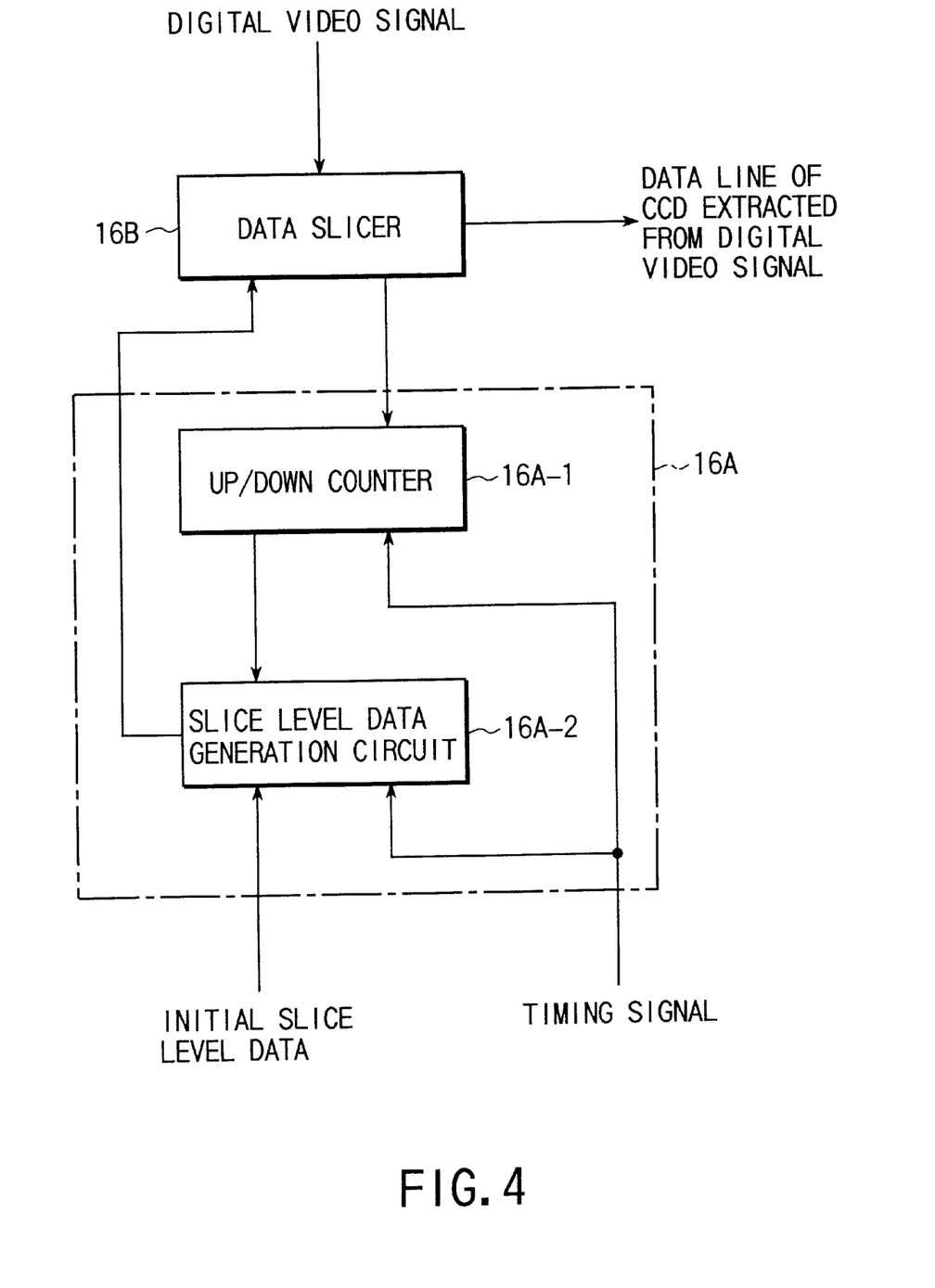
FIG. 4 is a block diagram showing an example of a slice level control circuit of the CCD reproduction circuit.

FIG. 4 illustrates a concrete example of the foregoing slice level control circuit 16A. In this example, a slice level is determined by detecting a duty ratio of a CRI signal and then obtaining an intermediate value of amplitude of the CRI signal.

Referring to FIG. 4, the slice level control circuit 16A includes an up-and-down counter 16A-1 and a slice level data generation circuit 16A-2.

The up-and-down counter 16A-1 performs an up-count operation or a down-count operation in accordance with a cycle of a positive/negative period of amplitude of a CRI signal contained in a data line of CCD supplied from the data slicer 16B. The counter 16A-1 then supplies the slice level data generation circuit 16A-2 with slice amount data (correction value) corresponding to the duty ratio of the CRI signal which is a count value for every cycle of the CRI signal. The count cycle of the up-and-down counter 16A-1 is controlled by a timing signal generated from the timing signal generation circuit 16K. Further, the up-and-down counter 16A-1 is reset by the timing signal output from the timing signal generation circuit 16K every count cycle in order to count slice amount data for one cycle of the CRI signal.

The slice level data generation circuit 16A-2 generates new slice level data by performing addition of the slice amount data supplied from the up-and-down counter 16A-1 and the slice level data supplied to the data slicer 16B or subtraction between them. The circuit 16A-2 then outputs the new slice level data to a level shift circuit (not shown) in the data slicer 16B. Finally, the slice level data generation circuit 16A-2 generates data of a slice level at which the CRI signal has an equal duty ratio (at which the slice amount data becomes zero). The operation cycle of the slice level data generation circuit 16A-2 is controlled by the timing signal generated from the timing signal generation circuit 16K. At the initial time, the circuit 16A-2 is supplied with initial slice level data from the microcomputer 17 as an initial value.

An operation of the slice level control circuit 16A having the above arrangement will now be described in brief.

The data slicer 16B is supplied with a digital video signal which is A/D-converted by the ADC 11 and from which both a noise component and an unnecessary-band signal are removed by the LPF 12.

The digital video signal, which is input to the data slicer 16B and on which a data line of CCD is superimposed, is pedestal-clamped in advance when it is an analog video signal input to the data extraction circuit 16 in a stage precedent to the ADC 11. The pedestal-clamping is an operation for holding a black level of the analog video signal in a fixed value. This operation is necessary for reproducing the brightness of an input analog video signal at an exact level when the level of a luminance signal contained in the analog video signal is chrominance-demodulated. Thus, the pedestal level of the analog video signal input to the data extraction circuit 16 always becomes constant whatever level the analog video signal has. For example, when the dynamic range of the ADC 11 is −48IRE to 144IRE as in the present embodiment, the pedestal level is always held in 0(zero)IRE (see FIG. 3).

To correctly obtain an intermediate value of amplitude of the CRI signal, in the above slice level control circuit 16A, the initial slice level data is input from the microcomputer 17 to the slice level data generation circuit 16A-2, in response to a timing signal generated from the timing signal generation circuit 16K. Then, the up-and-down counter 16A-1 is held in a reset state by the timing signal from the timing signal generation circuit 16K, and the slice amount data is 0. Thus, the slice level data generation circuit 16A-2 sends the initial slice level data to the data slicer 16B as slice level data.

In the data slicer 16B, the digital video signal input to the LPF 12 and the slice level data output from the slice level data generation circuit 16A-2 are added to each other. The digital video signal is shifted in accordance with the slice level data to extract a data line of CCD. The extracted CCD data line is then supplied to the slice level control circuit 16A as a signal for an up- or down-count operation in accordance with a cycle of a positive/negative period of amplitude of the CRI signal contained in the data line.

In the slice level control circuit 16A, the up-and-down counter 16A-1 performs an up- or down-count operation in response to a signal level from the data slicer 16B during a given period of time controlled by a timing signal generated from the timing signal generation circuit 16K. Then, slice amount data is obtained in accordance with the duty ratio for each cycle of the CRI signal and supplied to the slice level data generation circuit 16A-2.

The slice level data generation circuit 16A-2 receives the slice amount data from the up-and-down counter 16A-1 during the given period of time controlled by the timing signal from the timing signal generation circuit 16K to perform addition of the slice amount data and the slice level data supplied to the data slicer 16B or subtraction between them. New slice level data is thus generated and sent out to the data slicer 16B.

A series of operation is repeated in this manner. Finally, the slice level control circuit generates data of slice level at which the CRI signal has an equal duty ratio corresponding to an intermediate value of amplitude of the CRI signal, and supplies it to the data slicer 16B.

In this case, the intermediate value of amplitude of the CRI signal can correctly be obtained based on the duty ratio of the CRI signal. Consequently, even though the amplitude of the CRI signal is decreased due to deterioration of signal level of the data line of CCD, the CCD data line can stably be sliced.

An operation of the CCD reproduction circuit so arranged will now be outlined with reference to FIG. 2.

An analog video signal is input to the ADC 11 from a video signal output terminal of a television receiver. The ADC 11 converts the signal into a digital video signal and sends it to the LPF 12.

In the LPF 12, the digital video signal is so processed that a noise component and an undesired-band signal is eliminated therefrom, and the processed signal is supplied to the horizontal sync digital PLL circuit 13, vertical sync circuit 14, and data slicer 16B.

The digital video signal supplied to the horizontal sync digital PLL circuit 13 is used to generate an fh sync system clock signal which is synchronized with a horizontal sync signal fh.

The digital video signal supplied to the vertical sync circuit 14 is so processed that a vertical sync signal is separated therefrom and its synchronization is determined. The vertical sync signal is sent to the horizontal line detection circuit 15.

In response to the vertical sync signal, the circuit 15 detects a horizontal line of a digital video signal on which a data line of CCD is superimposed.

As described above, the digital video signal supplied to the data slicer 16B is so processed that a data line of CCD is extracted therefrom, based on the initial slice level data from the slice level control circuit 16A, in order to stably slice the data line of CCD.

After that, in order to determine a slice level necessary for stably extracting the data line of CCD, the slice level control circuit 16A detects a duty ratio of a CRI signal by the CCD data line from the data slicer 16B, as shown in FIG. 4. Then, slice amount data corresponding to the detected duty ratio is obtained, and a slice level is determined in accordance with the slice amount data.

In the slice level control circuit 16A, the slice level is reset every 1V (one cycle of one vertical synchronization) and detected, for example, every one cycle of the CRI signal.

Finally, a slice level corresponding to an intermediate value of amplitude of the CRI signal is determined, and the data slicer 16B extracts a data line of CCD by adding the slice level data determined by the slice level control circuit 16A and the digital video signal output from the LPF 12 to each other.

In this case, the data line of CCD is extracted from the digital video signal by integration having a small time constant, with a view to securing the performance of the circuit in a low electric field. The reference level of charging/discharging in this integration corresponds to the above slice level.

The data line of CCD extracted from the digital video signal is sent to the CRI detection circuit 16C to detect a CRI signal by counting the number of cycles. If a given number of cycles (e.g., three cycles) are counted, a CRI signal necessary for analyzing character data is supplied to the clock generation circuit 16E.

The data line of CCD extracted from the digital video signal is also sent to the start bit detection circuit 16D. By comparing a reference value provided by the microcomputer 17 with H and L periods of start bits contained in the data line of CCD, a start bit is detected. If a predetermined start bit is detected, a start bit detection signal is supplied to the clock generation circuit 16E.

The clock generation circuit 16E is cleared by the start bit detection signal supplied from the start bit detection circuit 16D. When the clock generation circuit 16E is supplied with a CRI detection signal from the CRI detection circuit 16C, it starts to carry out an oscillating operation in response to the fh sync system clock signal output from the horizontal sync digital PLL circuit 13 and generates a data extracting clock signal.

In this oscillating operation, when the fh sync system clock signal is 24 MHz (1536 fh) and the data rate of CCD is 500 KHz (32 fh) under the CCD standard, a 4-MHz clock signal is generated from the fh sync system clock signal of 24 MHz. The 4-MHz clock signal is frequency-divided into eight signals (each having 500 KHz) to generate a 32-fh clock signal (horizontal sync signal frequency 15.734 KHz× 32=503 KHz).

The oscillating operation is stopped by a control signal output when the clock control circuit 16F counts data extracting clock signals generated from the clock generation circuit 16E and comes to have a predetermined relationship (e.g., the oscillating operation is performed only during which period character data is extracted).

If the clock generation circuit 16E generates a data extracting clock signal, the register circuit 16G captures character data from the data line of CCD extracted from the digital video signal output from the data slicer 16B.

The parity of the character data of CCD captured by the register circuit 16G is checked by the parity determination circuit 16H. A result of the parity check is sent to the data holding circuit 16I.

In accordance with the result of the parity check, the data holding circuit 16I latches and holds the character data captured by the register circuit 16G.

The character data of CCD held in the data holding circuit 16I is supplied to the microcomputer 17 through the microcomputer I/F 16J at the readout request of the microcomputer 17.

It is thus possible to stably extract character data of CCD from a digital video signal on which a data line of CCD is superimposed. Consequently, a drawback in which no character data of CCD can be reproduced, can be resolved, even when an analog video signal varies in frequency.

Moreover, a clock signal for reproduction of data can stably be generated even when a nonstandard CRI signal is included in a data line of an analog video signal because the analog video signal is degraded by the status of radio wave and dubbing to lose part of pulses of the CRI signal. As a result, character data such as a closed caption and a text can be reproduced stably.

Furthermore, as described above, a data extracting clock signal can be generated on the basis of a horizontal sync signal. More specifically, an fh sync system clock signal, which is synchronized with a horizontal sync signal fh, is generated from a digital video signal, and a data extracting clock signal, which is synchronized with the horizontal sync signal fh, is generated by the digital oscillation circuit in response to the fh sync system clock signal. The fh sync system clock signal is generated using the digital PLL circuit. The fh sync system clock signal can thus be caused to follow horizontal jitters caused by frequency variations due to variations in both noise and reference signal, as can be the data extracting clock signal. Therefore, the character data of CCD can be extracted stably following the horizontal jitters, with the result that a drawback in which no character data can be reproduced with stability, can be resolved when the video signal varies in frequency.

Since, furthermore, the video signal is treated as a digital signal, an analog element other than the ADC and the VCO (voltage controlled oscillator) of the PLL circuit need not be employed, and all circuits except the ADC and VCO can be constituted of digital circuits. In particular, when the digital filter is designed to fulfill a function of another circuit, such as extraction of a brightness signal, the entire circuit can be simplified more greatly.

The foregoing embodiment of the present invention is directed to extraction of character data of CCD. The present invention is not limited to this, but can be applied to extraction of character data such as a text and, in this case, a clock rate mfh (fh=horizontal sync signal synchronization) has to be reproduced in accordance with the standard of text data. For example, the clock generation circuit has only to generate a clock (mfh clock) signal, whose cycle is m times as long as that of the fh sync system clock signal generated by the horizontal sync digital PLL circuit, based on a clock signal whose cycle is n times as long as that of the fh sync system clock signal.

The reference signal used for generating the above system clock signal is not limited to the horizontal sync signal. For example, an fsc signal (such as an fsc sync system clock signal) can be employed.

In the slice level control circuit, the maximum and minimum values of amplitude of the CRI signal can be detected, and an intermediate value between them is obtained from the initial value provided by the microcomputer. This intermediate value can be regarded as a slice level.

It is needless to say that various changes and modifications can be made without departing from the scope of the subject matter of the present invention.

According to the present invention detailed above, an fh sync system clock signal can be caused to follow horizontal jitters caused by frequency variations and so can be a data extracting clock signal. Consequently, a data extraction circuit is provided in which a data extracting clock signal can stably be generated, irrespective of variations in frequency, and character data can stably be reproduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data extraction circuit comprising:
    a slice level determination circuit configured to determine a slice level of a data line of character data superimposed on a digital video signal;
    a line extraction circuit configured to slice the digital video signal by the slice level and extract the data line of the character data from the digital video signal;
    a sync signal detection circuit configured to detect a sync signal for analyzing the character data, the sync signal being contained in the data line of the character data;
    a bit detection circuit configured to detect a start bit indicative of a start of the character data, the start bit being contained in the data line of the character data;
    a clock generation circuit configured to generate a data extracting clock, which is synchronized with a reference signal, based on detection results of the sync signal and the start bit; and
    a data reproduction section configured to reproduce the character data from the data line of the character data using the data extracting clock,
        wherein the reference signal is an fsc signal of the digital video signal.

2. A data extraction circuit wherein:
    a slice level determination circuit configured to determine a slice level of a data line of character data superimposed on a digital video signal;

a line extraction circuit configured to slice the digital video signal by the slice level and extract the data line of the character data from the digital video signal;

a sync signal detection circuit configured to detect a sync signal for analyzing the character data, the sync signal being contained in the data line of the character data;

a bit detection circuit configured to detect a start bit indicative of a start of the character data, the start bit being contained in the data line of the character data;

a clock generation circuit configured to generate a data extracting clock, which is synchronized with a reference signal, based on detection results of the sync signal and the start bit; and a data reproduction section configured to reproduce the character data from the data line of the character data using the data extracting clock, wherein the slice level is determined based on a duty ratio of the sync signal.

3. A data extraction circuit comprising:

a slice level determination circuit configured to determine a slice level of a data line of character data superimposed on a digital video signal;

a line extraction circuit configured to slice the digital video signal by the slice level and extract the data line of the character data from the digital video signal;

a sync signal detection circuit configured to detect a sync signal for analyzing the character data, the sync signal being contained in the data line of the character data;

bit detection circuit configured to detect a start bit indicative of a start of the character data, the start bit being contained in the data line of the character data;

a clock generation circuit configured to generate a data extracting clock, which is synchronized with a reference signal, based on detection results of the sync signal and the start bit;

a data reproduction section configured to reproduce the character data from the data line of the character data using the data extracting clock; and a filter circuit configured to eliminate a noise component from the digital video signal, the filter circuit functioning as a digital filter in another circuit block.

4. A data extraction circuit comprising:

a slice level determination circuit configured to determine a slice level of a data line of character data superimposed on a digital video signal;

a line extraction circuit configured to slice the digital video signal by the slice level and extract the data line of the character data from the digital video signal;

a sync signal detection circuit configured to detect a sync signal for analyzing the character data, the sync signal being contained in the data line of the character data;

a bit detection circuit configured to detect a start bit indicative of a start of the character data, the start bit being contained in the data line of the character data;

a clock generation circuit configured to generate a data extracting clock, which is synchronized with a reference signal, based on detection results of the sync signal and the start bit; and a data reproduction section configured to reproduce the character data from the data line of the character data using the data extracting clock, wherein the data reproduction section includes a register circuit configured to extract the character data from the data line of the character data, a parity determination circuit configured to check parity of the character data extracted by the register circuit, a data holding circuit configured to capture and hold the character data based on a determination result output from the parity determination circuit, and an interface circuit configured to read the character data out of the data holding circuit.

5. A data extraction circuit comprising:

a first clock generation circuit for generating a system clock, which is synchronized with a reference signal, from a digital video signal on which standardized character data is superimposed as a data line;

a slice level determination circuit for determining a slice level of the data line of the character data;

a line extraction circuit for slicing the digital video signal by the slice level determined by the slice level determination circuit and extracting the data line of the character data from the digital video signal;

a sync signal detection circuit for detecting whether a sync signal for analyzing the character data is present, from the data line of the character data extracted by the line extraction circuit;

a bit detection circuit for detecting a start bit, which indicates a start of the character data, from the data line of the character data extracted by the line extraction circuit;

a second clock generation circuit for generating a data extracting clock, which is synchronized with the reference signal, in response to the system clock generated by the first clock generation circuit based on detection results of the sync signal detection circuit and the bit detection circuit; and a data reproduction section for reproducing the character data from the data line of the character data extracted by the line extraction circuit, using the data extracting clock generated by the second clock generation circuit.

6. A data extraction circuit according to claim 5, wherein the character data includes at least one of a closed caption data and a text data.

7. A data extraction circuit according to claim 5, further comprising a filter circuit for eliminating a noise component from the digital video signal, the filter circuit functioning as a digital filter in another circuit block.

8. A data extraction circuit according to claim 5, wherein the slice level determination circuit determines the slice level by detecting the sync signal for analyzing the character data from the data line of the character data extracted by the line extraction circuit.

9. A data extraction circuit according to claim 8, wherein the slice level determination circuit determines the slice level based on a correction value corresponding to a duty ratio of the sync signal.

10. A data extraction circuit according to claim 9, wherein the slice level determination circuit includes:

an up-and-down counter for performing a count operation in accordance with a cycle of positive and negative periods of amplitude of the sync signal; and a slice level data generation circuit for capturing a count value of the up-and-down counter and generating slice level data corresponding to an intermediate value of the amplitude of the sync signal.

11. A data extraction circuit according to claim 8, wherein the slice level determination circuit obtains an intermediate value between maximum and minimum values of amplitude of the sync signal, the intermediate value corresponding to the slice level.

12. A data extraction circuit according to claim 5, further comprising a clock control circuit for counting the data extracting clock output from the second clock generation circuit and controlling an oscillation time period of the second clock generation circuit.

13. A data extraction circuit according to claim 5, wherein the reference signal is a horizontal sync signal of the digital video signal.

14. A data extraction circuit according to claim 5, wherein the second clock generation circuit generates a clock whose cycle is 32 times as long as a horizontal sync signal cycle synchronized with a horizontal sync signal, based on a clock whose cycle is 1536 times as long as the horizontal sync signal cycle synchronized with the horizontal sync signal generated by the first clock generation circuit, when a closed caption data is extracted as the character data.

15. A data extraction circuit according to claim 5, wherein the second clock generation circuit generates a clock whose cycle is m times as long as a horizontal sync signal cycle synchronized with a horizontal sync signal, based on a clock whose cycle is n times as long as the horizontal sync signal cycle synchronized with the horizontal sync signal generated by the first clock generation circuit, when a text data is extracted as the character data.

16. A data extraction circuit according to claim 5, wherein the reference signal is an fsc signal of the digital video signal.

17. A data extraction circuit according to claim 5, wherein the data reproduction section includes a register circuit for extracting the character data from the data line of the character data, a parity determination circuit for checking parity of the character data extracted by the register circuit, a data holding circuit for capturing and holding the character data based on a determination result output from the parity determination circuit, and an interface circuit for reading the character data out of the data holding circuit.

* * * * *